United States Patent
Jang

(10) Patent No.: US 11,924,419 B2
(45) Date of Patent: *Mar. 5, 2024

(54) IMAGE ENCODING/DECODING METHOD AND DEVICE USING FILTERING, AND METHOD FOR TRANSMITTING BITSTREAM

(71) Applicant: LG Electronics Inc., Seoul (KR)

(72) Inventor: Hyeong Moon Jang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/969,175

(22) Filed: Oct. 19, 2022

(65) Prior Publication Data

US 2023/0047287 A1 Feb. 16, 2023

Related U.S. Application Data

(63) Continuation of application No. 17/579,145, filed on Jan. 19, 2022, now Pat. No. 11,539,945, which is a
(Continued)

(51) Int. Cl.
*H04N 19/117* (2014.01)
*H04N 19/119* (2014.01)
(Continued)

(52) U.S. Cl.
CPC ......... *H04N 19/117* (2014.11); *H04N 19/119* (2014.11); *H04N 19/176* (2014.11); *H04N 19/86* (2014.11)

(58) Field of Classification Search
CPC .. H04N 19/117; H04N 19/119; H04N 19/176; H04N 19/82; H04N 19/86; H04N 19/96
See application file for complete search history.

(56) References Cited

U.S. PATENT DOCUMENTS 9,088,786 B2 * 7/2015 Ikeda ................ H04N 19/86
2008/0117981 A1 5/2008 Lee et al.
(Continued)

FOREIGN PATENT DOCUMENTS

KR 20170137959 12/2017
KR 20190034276 4/2019
(Continued)

OTHER PUBLICATIONS

Jang et al., "CE5-2.3 and CE5-2.4: filter length decision which support parallel processing and aligned filtering block edge," JVET-O0091-v4, Presented at Joint Video Experts Team (JVET) of ITU-T SG 16 WP 3 and ISO/IEC JTC 1/SC 29/WG 11, 15th Meeting: Gothenburg, SE, Jul. 3-12, 2019, 13 pages.
(Continued)

*Primary Examiner* — Md N Haque
(74) *Attorney, Agent, or Firm* — Fish & Richardson P.C.

(57) ABSTRACT

An image encoding/decoding method and apparatus are provided. An image decoding method performed by an image decoding apparatus may comprise deriving a reconstructed block for a current block, deriving a target boundary for the reconstructed block, determining a filter length of a deblocking filter to be applied for the target boundary, and applying the deblocking filter for the target boundary based on the determined filter length. The filter length may be determined based on at least one of a width or height of a transform block adjacent to the target boundary.

11 Claims, 16 Drawing Sheets

Related U.S. Application Data continuation of application No. PCT/KR2020/009523, filed on Jul. 20, 2020.

(60) Provisional application No. 62/875,974, filed on Jul. 19, 2019.

(51) Int. Cl.
*H04N 19/176* (2014.01)
*H04N 19/86* (2014.01)

(56) References Cited

U.S. PATENT DOCUMENTS

| | | | |
|---|---|---|---|
| 2013/0028531 A1* | 1/2013 | Sato | H04N 19/117 382/233 |
| 2014/0204999 A1* | 7/2014 | Park | H04N 19/117 375/240.02 |
| 2016/0100163 A1 | 4/2016 | Rapaka et al. | |
| 2017/0064307 A1 | 3/2017 | Jang | |
| 2019/0238890 A1* | 8/2019 | Tsai | H04N 19/80 |
| 2019/0394463 A1 | 12/2019 | Chen et al. | |
| 2021/0329266 A1 | 10/2021 | Andersson et al. | |

FOREIGN PATENT DOCUMENTS

| | | |
|---|---|---|
| RU | 2355125 | 5/2009 |
| RU | 2606304 | 1/2017 |
| WO | WO2011145601 | 11/2011 |
| WO | WO2018038492 | 3/2018 |
| WO | WO2019137751 | 7/2019 |

OTHER PUBLICATIONS

Office Action in Canadian Appln. No. 3148076, dated Mar. 2, 2023, 7 pages.

Office Action in Russian Appln. No. 2022104065, dated Jul. 7, 2022, 12 pages (with English translation).

Unno et al., "Non-CE3: Relaxation method of processing dependency in ISP for small blocks," JVET-N0159-v2, Presented at Joint Video Experts Team (JVET) of ITU-T SG 16 WP 3 and ISO/IEC JTC 1/SC 29/WG 11, 14th Meeting: Geneva, CH, Mar. 19-27, 2019, 6 pages.

* cited by examiner

SPLIT_BT_VER    SPLIT_BT_HOR    SPLIT_TT_VER    SPLIT_TT_HOR

IMAGE ENCODING/DECODING METHOD AND DEVICE USING FILTERING, AND METHOD FOR TRANSMITTING BITSTREAM

CROSS-REFERENCE TO RELATED APPLICATIONS

This application is a continuation of U.S. application Ser. No. 17/579,145, filed on Jan. 19, 2022, which is a continuation pursuant to 35 U.S.C. § 119(e) of International Application PCT/KR2020/009523, with an international filing date of Jul. 20, 2020, which claims the benefit of U.S. Provisional Patent Application No. 62/875,974, filed on Jul. 19, 2019, the contents of which are hereby incorporated by reference herein in their entirety.

TECHNICAL FIELD

The present disclosure relates to an image encoding/decoding method and apparatus and a method of transmitting a bitstream, and, more particularly, to a method and apparatus for encoding/decoding an image using filtering, and a method of transmitting a bitstream generated by the image encoding method/apparatus of the present disclosure.

BACKGROUND

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

SUMMARY

An object of the present disclosure is to provide an image encoding/decoding method and apparatus with improved encoding/decoding efficiency.

An object of the present disclosure is to provide a method and apparatus for encoding/decoding an image using filtering.

Another object of the present disclosure is to provide a method of transmitting a bitstream generated by an image encoding method or apparatus according to the present disclosure.

Another object of the present disclosure is to provide a recording medium storing a bitstream generated by an image encoding method or apparatus according to the present disclosure.

Another object of the present disclosure is to provide a recording medium storing a bitstream received, decoded and used to reconstruct an image by an image decoding apparatus according to the present disclosure.

The technical problems solved by the present disclosure are not limited to the above technical problems and other technical problems which are not described herein will become apparent to those skilled in the art from the following description.

According to an image encoding/decoding method according to an aspect of the present disclosure, since a situation in which parallel processing of the deblocking filter is impossible due to a decrease in size of the transform block or a situation in which overlapping between filters occurs due to different target boundaries does not occur, the image encoding/decoding apparatus may always perform filter parallel processing and image encoding/decoding efficiency may increase.

An image decoding method performed by an image decoding apparatus according to an aspect of the present disclosure may comprise deriving a reconstructed block for a current block, deriving a target boundary for the reconstructed block, determining a filter length of a deblocking filter to be applied for the target boundary, and applying the deblocking filter for the target boundary based on the determined filter length. The filter length may be determined based on at least one of a width or height of a transform block adjacent to the target boundary.

In the image decoding method of the present disclosure, the current block may be a block to which intra sub-partitions (ISP) mode applies.

The image decoding method of the present disclosure may further comprise determining a boundary type of the target boundary, and the boundary type may be determined to be one of a vertical boundary and a horizontal boundary.

In the image decoding method of the present disclosure, based on the target boundary being a vertical boundary and the width of the transform block being equal to or less than a first value, the filter length may be determined to be a first length.

In the image decoding method of the present disclosure, based on the width of the transform block being equal to or greater than a second value, the filter length may be determined to be a second length.

In the image decoding method of the present disclosure, based on the width of the transform block being greater than the first value and being less than the second value, the filter length may be determined to be a third length.

In the image decoding method of the present disclosure, the first value may be 4 and the first length may be 1.

In the image decoding method of the present disclosure, based on the target boundary being a horizontal boundary and the height of the transform block being equal to or less than a first value, the filter length may be determined to be a first length.

In the image decoding method of the present disclosure, based on the height of the transform block being equal to or greater than a second value, the filter length may be determined to be a second length.

In the image decoding method of the present disclosure, based on the height of the transform block being greater than the first value and being less than the second value, the filter length may be determined to be a third length.

In the image decoding method of the present disclosure, the first value is 4 and the first length may be 1.

An image decoding apparatus according to another aspect of the present disclosure may comprise a memory and at least one processor.

The at least one processor may derive a reconstructed block for a current block, derive a target boundary for the reconstructed block, determine a filter length of a deblocking filter to apply to the target boundary, and apply the deblocking filter to the target boundary based on the determined filter length. The filter length may be determined based on at least one of a width or height of a transform block adjacent to the target boundary.

An image encoding method according to another aspect of the present disclosure may comprise deriving a reconstructed block for a current block, deriving a target boundary for the reconstructed block, determining a filter length of a deblocking filter to be applied for the target boundary, and applying the deblocking filter for the target boundary based on the determined filter length. The filter length may be determined based on at least one of a width or height of a transform block adjacent to the target boundary.

In the image encoding method of the present disclosure, the current block may be a block to which intra sub-partitions (ISP) mode applies.

In addition, a computer-readable recording medium according to another aspect of the present disclosure may store the bitstream generated by the image encoding apparatus or the image encoding method of the present disclosure.

The features briefly summarized above with respect to the present disclosure are merely exemplary aspects of the detailed description below of the present disclosure, and do not limit the scope of the present disclosure.

According to the present disclosure, it is possible to provide an image encoding/decoding method and apparatus with improved encoding/decoding efficiency.

Also, according to the present disclosure, it is possible to provide a method and apparatus for encoding/decoding an image using filtering.

Also, according to the present disclosure, it is possible to provide a method of transmitting a bitstream generated by an image encoding method or apparatus according to the present disclosure.

Also, according to the present disclosure, it is possible to provide a recording medium storing a bitstream generated by an image encoding method or apparatus according to the present disclosure.

Also, according to the present disclosure, it is possible to provide a recording medium storing a bitstream received, decoded and used to reconstruct an image by an image decoding apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

DETAILED DESCRIPTION

Figure 1:
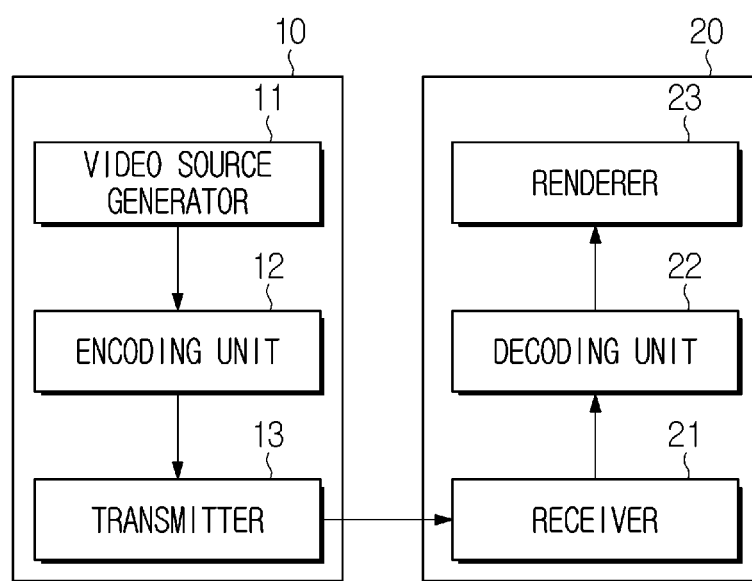
FIG. 1 is a view schematically showing a video coding system, to which an embodiment of the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, a "picture" generally refers to a unit representing one image in a specific time period, and a slice/tile is a coding unit constituting a part of a picture, and one picture may be composed of one or more slices/tiles. In addition, a slice/tile may include one or more coding tree units (CTUs).

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. The unit may be used interchangeably with terms such as "sample array", "block" or "area" in some cases. In a general case, an M×N block may include samples (or sample arrays) or a set (or array) of transform coefficients of M columns and N rows.

In the present disclosure. "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

Overview of Video Coding System

FIG. 1 is a view showing a video coding system according to the present disclosure.

The video coding system according to an embodiment may include a encoding apparatus 10 and a decoding apparatus 20. The encoding apparatus 10 may deliver encoded video and/or image information or data to the decoding apparatus 20 in the form of a file or streaming via a digital storage medium or network.

The encoding apparatus 10 according to an embodiment may include a video source generator 11, an encoding unit 12 and a transmitter 13. The decoding apparatus 20 according to an embodiment may include a receiver 21, a decoding unit 22 and a renderer 23. The encoding unit 12 may be called a video/image encoding unit, and the decoding unit 22 may be called a video/image decoding unit. The transmitter 13 may be included in the encoding unit 12. The receiver 21 may be included in the decoding unit 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding unit 12 may encode an input video/image. The encoding unit 12 may perform a series of procedures such as prediction, transform, and quantization for compression and coding efficiency. The encoding unit 12 may output encoded data (encoded video/image information) in the form of a bitstream.

The transmitter 13 may transmit the encoded video/image information or data output in the form of a bitstream to the receiver 21 of the decoding apparatus 20 through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The receiver 21 may extract/receive the bitstream from the storage medium or network and transmit the bitstream to the decoding unit 22.

The decoding unit 22 may decode the video/image by performing a series of procedures such as dequantization, inverse transform, and prediction corresponding to the operation of the encoding unit 12.

The renderer 23 may render the decoded video/image. The rendered video/image may be displayed through the display.

Overview of Image Encoding Apparatus

Figure 2:
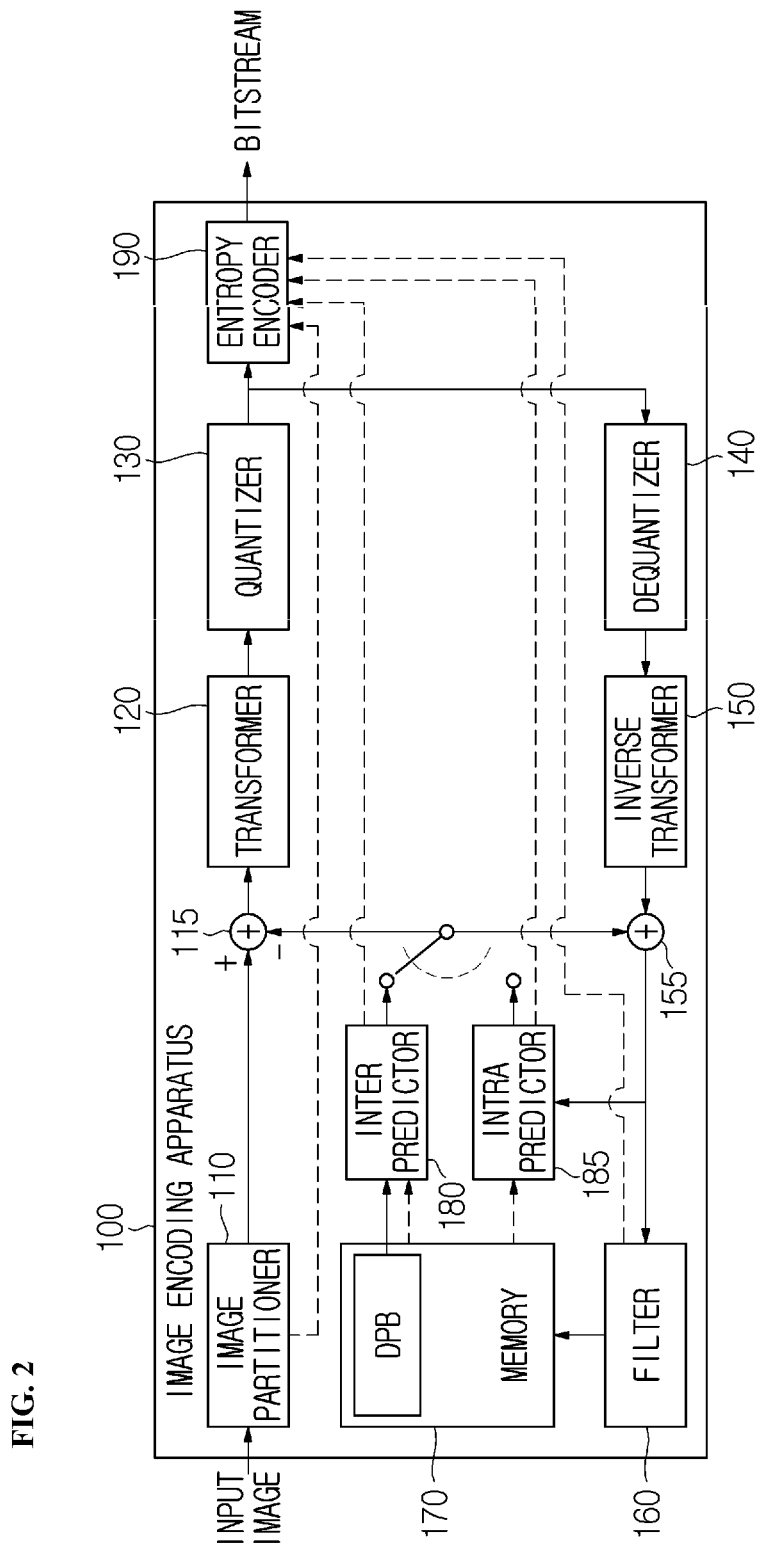
FIG. 2 is a view schematically showing an image encoding apparatus, to which an embodiment of the present disclosure is applicable.

FIG. 2 is a view schematically showing an image encoding apparatus, to which an embodiment of the present disclosure is applicable.

As shown in FIG. 2, the image encoding apparatus 100 may include an image partitioner 110, a subtractor 115, a transformer 120, a quantizer 130, a dequantizer 140, an inverse transformer 150, an adder 155, a filter 160, a memory 170, an inter prediction unit 180, an intra prediction unit 185 and an entropy encoder 190. The inter prediction unit 180 and the intra prediction unit 185 may be collectively referred to as a "prediction unit". The transformer 120, the quantizer 130, the dequantizer 140 and the inverse transformer 150 may be included in a residual processor. The residual processor may further include the subtractor 115.

All or at least some of the plurality of components configuring the image encoding apparatus 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image encoding apparatus 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The prediction unit (the inter prediction unit 180 or the intra prediction unit 185) may perform prediction on a block to be processed (current block) and generate a predicted block including prediction samples for the current block. The prediction unit may determine whether intra prediction or inter prediction is applied on a current block or CU basis. The prediction unit may generate various information related to prediction of the current block and transmit the generated information to the entropy encoder 190. The information on the prediction may be encoded in the entropy encoder 190 and output in the form of a bitstream.

The intra prediction unit 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra prediction unit 185 may determine the prediction mode applied to the current block by using a prediction mode applied to a neighboring block.

The inter prediction unit 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter prediction unit 180 may configure a motion information candidate list based on neighboring blocks and generate information specifying which candidate is used to derive a motion vector and/or a reference picture index of the current block. Inter prediction may be performed based on various prediction modes. For example, in the case of a skip mode and a merge mode, the inter prediction unit 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The prediction unit may generate a prediction signal based on various prediction methods and prediction techniques described below. For example, the prediction unit may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the prediction unit may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance.

The prediction signal generated by the prediction unit may be used to generate a reconstructed signal or to generate a residual signal. The subtractor 115 may generate a residual signal (residual block or residual sample array) by subtracting the prediction signal (predicted block or prediction sample array) output from the prediction unit from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loéve transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block form into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image encoding apparatus 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter prediction unit 180 or the intra prediction unit 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may apply in a picture encoding process as described below.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter prediction unit 180. When inter prediction is applied through the image encoding apparatus 100, prediction mismatch between the image encoding apparatus 100 and the image decoding apparatus may be avoided and encoding efficiency may be improved.

The DPB of the memory 170 may store the modified reconstructed picture for use as a reference picture in the inter prediction unit 180. The memory 170 may store the motion information of the block from which the motion information in the current picture is derived (or encoded) and/or the motion information of the blocks in the picture that have already been reconstructed. The stored motion information may be transmitted to the inter prediction unit 180 and used as the motion information of the spatial neighboring block or the motion information of the temporal neighboring block. The memory 170 may store reconstructed samples of reconstructed blocks in the current picture and may transfer the reconstructed samples to the intra prediction unit 185.

Overview of Image Decoding Apparatus

Figure 3:
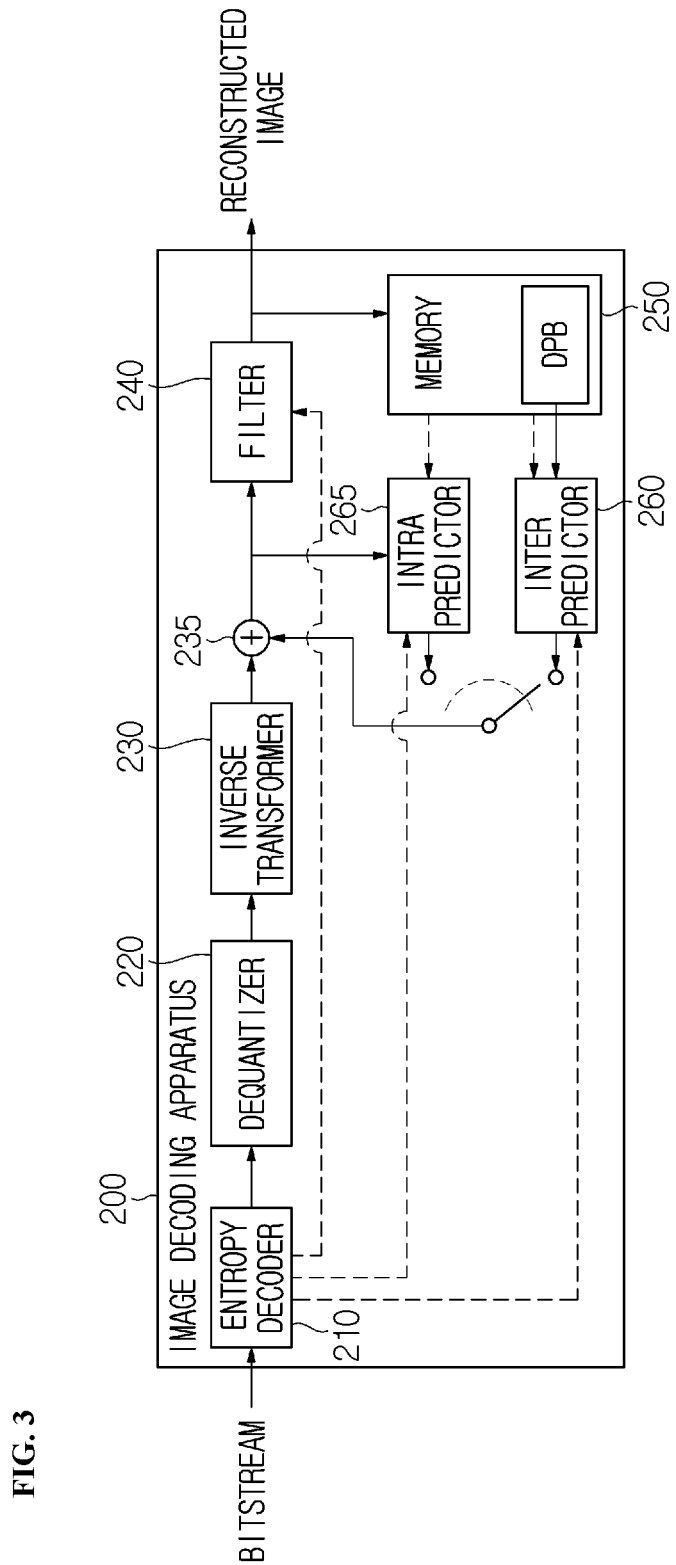
FIG. 3 is a view schematically showing an image decoding apparatus, to which an embodiment of the present disclosure is applicable.

FIG. 3 is a view schematically showing an image decoding apparatus, to which an embodiment of the present disclosure is applicable.

As shown in FIG. 3, the image decoding apparatus 200 may include an entropy decoder 210, a dequantizer 220, an inverse transformer 230, an adder 235, a filter 240, a memory 250, an inter prediction unit 260 and an intra prediction unit 265. The inter prediction unit 260 and the intra prediction unit 265 may be collectively referred to as a "prediction unit". The dequantizer 220 and the inverse transformer 230 may be included in a residual processor.

All or at least some of a plurality of components configuring the image decoding apparatus 200 may be configured by a hardware component (e.g., a decoder or a processor) according to an embodiment. In addition, the memory 250 may include a decoded picture buffer (DPB) or may be configured by a digital storage medium.

The image decoding apparatus 200, which has received a bitstream including video/image information, may reconstruct an image by performing a process corresponding to a process performed by the image encoding apparatus 100 of FIG. 1. For example, the image decoding apparatus 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image decoding apparatus 200 may be reproduced through a reproducing apparatus (not shown).

The image decoding apparatus 200 may receive a signal output from the image encoding apparatus of FIG. 1 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the prediction unit (the inter prediction unit 260 and the intra prediction unit 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image decoding apparatus 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter prediction unit 260 or the intra prediction unit 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The prediction unit may perform prediction on the current block and generate a predicted block including prediction samples for the current block. The prediction unit may determine whether intra prediction or inter prediction is applied to the current block based on the information on the prediction output from the entropy decoder 210 and may determine a specific intra/inter prediction mode (prediction technique).

It is the same as described in the prediction unit of the image encoding apparatus 100 that the prediction unit may generate the prediction signal based on various prediction methods (techniques) which will be described later.

The intra prediction unit 265 may predict the current block by referring to the samples in the current picture. The description of the intra prediction unit 185 is equally applied to the intra prediction unit 265.

The inter prediction unit 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter prediction unit 260 may configure a motion information candidate list based on neighboring blocks and derive a motion vector of the current block and/or a reference picture index based on the received candidate selection information. Inter prediction may be performed based on various prediction modes, and the information on the prediction may include information specifying a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the prediction unit (including the inter prediction unit 260 and/or the intra prediction unit 265). The description of the adder 155 is equally applicable to the adder 235.

Meanwhile, luma mapping with chroma scaling (LMCS) may apply in a picture decoding process as described below.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter prediction unit 260. The memory 250 may store the motion information of the block from which the motion information in the current picture is derived (or decoded) and/or the motion information of the blocks in the picture that have already been reconstructed. The stored motion information may be transmitted to the inter prediction unit 260 so as to be utilized as the motion information of the spatial neighboring block or the motion information of the temporal neighboring block. The memory 250 may store reconstructed samples of reconstructed blocks in the current picture and transfer the reconstructed samples to the intra prediction unit 265.

In the present disclosure, the embodiments described in the filter 160, the inter prediction unit 180, and the intra prediction unit 185 of the encoding apparatus 100 may be equally or correspondingly applied to the filter 240, the inter prediction unit 260, and the intra prediction unit 265 of the image decoding apparatus 200.

Overview of Partitioning of CTU

As described above, the coding unit may be acquired by recursively partitioning the coding tree unit (CTU) or the largest coding unit (LCU) according to a quad-tree/binary-tree/ternary-tree (QT/BT/TT) structure. For example, the CTU may be first partitioned into quadtree structures. Thereafter, leaf nodes of the quadtree structure may be further partitioned by a multi-type tree structure.

Partitioning according to quadtree means that a current CU (or CTU) is partitioned into equally four. By partitioning according to quadtree, the current CU may be partitioned into four CUs having the same width and the same height. When the current CU is no longer partitioned into the quadtree structure, the current CU corresponds to the leaf node of the quad-tree structure. The CU corresponding to the leaf node of the quadtree structure may be no longer partitioned and may be used as the above-described final coding unit. Alternatively, the CU corresponding to the leaf node of the quadtree structure may be further partitioned by a multi-type tree structure.

Figure 4:
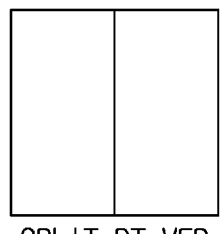
FIG. 4 is a view illustrating an embodiment of a partitioning type of a block according to a multi-type tree structure.
Figure 4:
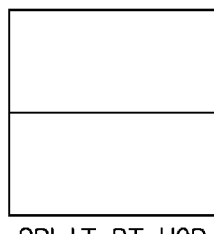
Figure 4:
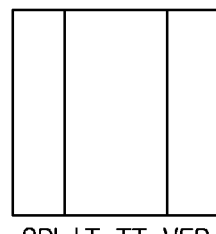
Figure 4:
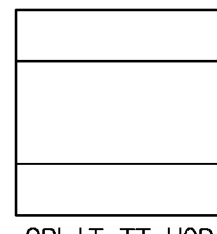

FIG. 4 is a view showing an embodiment of a partitioning type of a block according to a multi-type tree structure. Partitioning according to the multi-type tree structure may include two types of splitting according to a binary tree structure and two types of splitting according to a ternary tree structure.

The two types of splitting according to the binary tree structure may include vertical binary splitting (SPLIT_BT_VER) and horizontal binary splitting (SPLIT_BT_HOR). Vertical binary splitting (SPLIT_BT_VER) means that the current CU is split into equally two in the vertical direction. As shown in FIG. 4, by vertical binary splitting, two CUs having the same height as the current CU and having a width which is half the width of the current CU may be generated. Horizontal binary splitting (SPLIT_BT_HOR) means that the current CU is split into equally two in the horizontal direction. As shown in FIG. 4, by horizontal binary splitting, two CUs having a height which is half the height of the current CU and having the same width as the current CU may be generated.

Two types of splitting according to the ternary tree structure may include vertical ternary splitting (SPLIT_TT_VER) and horizontal ternary splitting (SPLIT_TT_HOR). In vertical ternary splitting (SPLIT_TT_VER), the current CU is split in the vertical direction at a ratio of 1:2:1. As shown in FIG. 4, by vertical ternary splitting, two CUs having the same height as the current CU and having a width which is ¼ of the width of the current CU and a CU having the same height as the current CU and having a width which is half the width of the current CU may be generated. In horizontal ternary splitting (SPLIT_TT_HOR), the current CU is split in the horizontal direction at a ratio of 1:2:1. As shown in FIG. 4, by horizontal ternary splitting, two CUs having a height which is ¼ of the height of the current CU and having the same width as the current CU and a CU having a height which is half the height of the current CU and having the same width as the current CU may be generated.

Figure 5:
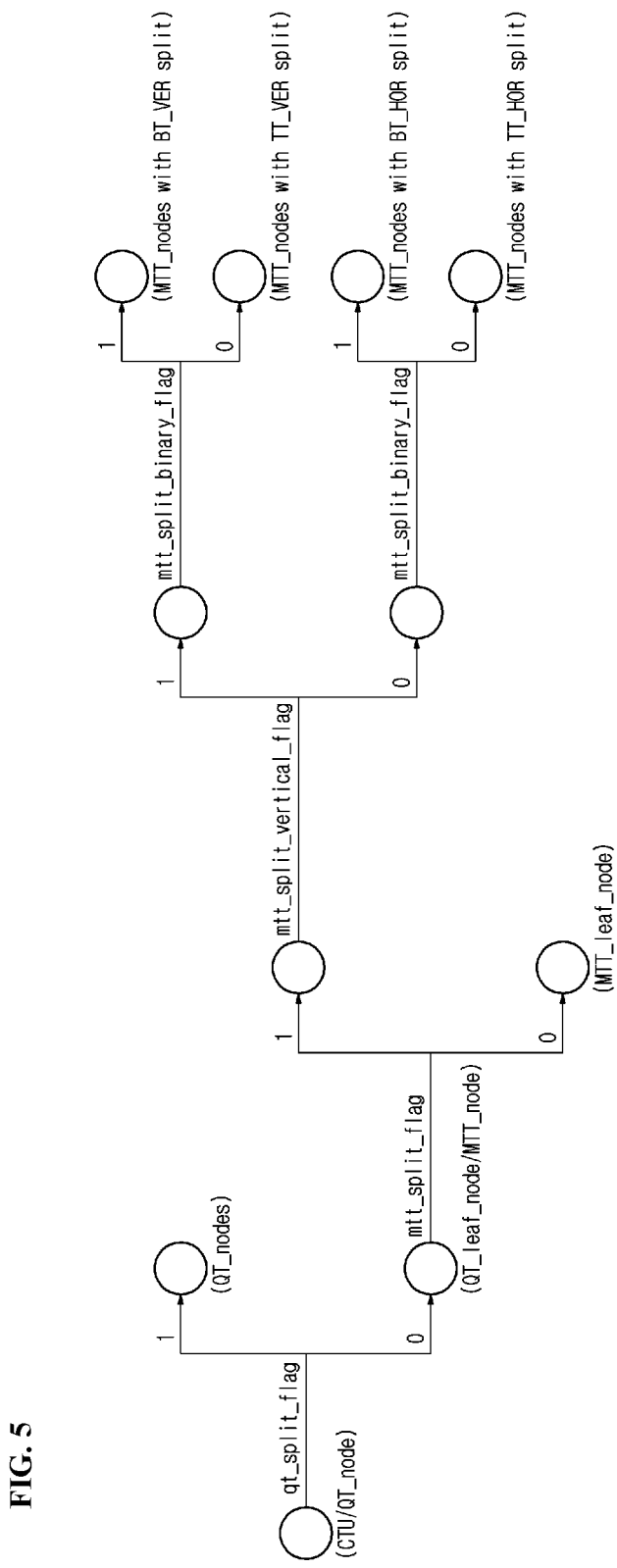
FIG. 5 is a view illustrating a signaling mechanism of block splitting information in a quadtree with nested multi-type tree structure according to the present disclosure.

FIG. 5 is a view showing a signaling mechanism of partition splitting information in a quadtree with nested multi-type tree structure according to the present disclosure.

Here, the CTU is treated as the root node of the quadtree, and is partitioned for the first time into a quadtree structure. Information (e.g., qt_split_flag) specifying whether quadtree splitting is performed on the current CU (CTU or node (QT node) of the quadtree) is signaled. For example, when qt_split_flag has a first value (e.g., "1"), the current CU may be quadtree-partitioned. In addition, when qt_split_flag has a second value (e.g., "0"), the current CU is not quadtree-partitioned, but becomes the leaf node (QT_leaf_node) of the quadtree. Each quadtree leaf node may then be further partitioned into multitype tree structures. That is, the leaf node of the quadtree may become the node (MTT_node) of the multi-type tree. In the multitype tree structure, a first flag (e.g., Mtt_split_cu_flag) is signaled to specify whether the current node is additionally partitioned. If the corresponding node is additionally partitioned (e.g., if the first flag is 1), a second flag (e.g., Mtt_split_cu_vertical_flag) may be signaled to specify the splitting direction. For example, the splitting direction may be a vertical direction if the second flag is 1 and may be a horizontal direction if the second flag is 0. Then, a third flag (e.g., Mtt_split_cu_binary_flag) may be signaled to specify whether the split type is a binary split type or a ternary split type. For example, the split type may be a binary split type when the third flag is 1 and may be a ternary split type when the third flag is 0. The node of the multi-type tree acquired by binary splitting or ternary splitting may be further partitioned into multi-type tree structures. However, the node of the multi-type tree may not be partitioned into quadtree structures. If the first flag is 0, the corresponding node of the multi-type tree is no longer split but becomes the leaf node (MTT_leaf_node) of the multi-type tree. The CU corresponding to the leaf node of the multi-type tree may be used as the above-described final coding unit.

Based on the mtt_split_cu_vertical_flag and the mit_split_cu_binary_flag, a multi-type tree splitting mode (MttSplitMode) of a CU may be derived as shown in Table 1 below.

TABLE 1

| MttSplitMode | mtt_split_cu_vertical_flag | mtt_split_cu_binary_flag |
|---|---|---|
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

A CTU may include a coding block of luma samples (hereinafter referred to as a "luma block") and two coding blocks of chroma samples corresponding thereto (hereinafter referred to as "chroma blocks"). The above-described coding tree scheme may be equally or separately applied to the luma block and chroma block of the current CU. Specifically, the luma and chroma blocks in one CTU may be partitioned into the same block tree structure and, in this case, the tree structure is represented as SINGLE_TREE. Alternatively, the luma and chroma blocks in one CTU may be partitioned into separate block tree structures, and, in this case, the tree structure may be represented as DUAL_TREE.

That is, when the CTU is partitioned into dual trees, the block tree structure for the luma block and the block tree structure for the chroma block may be separately present. In this case, the block tree structure for the luma block may be called DUAL_TREE_LUMA, and the block tree structure for the chroma component may be called DUAL_TREE_CHROMA. For P and B slice/tile groups, luma and chroma blocks in one CTU may be limited to have the same coding tree structure. However, for I slice/tile groups, luma and chroma blocks may have a separate block tree structure from each other. If the separate block tree structure is applied, the luma CTB may be partitioned into CUs based on a particular coding tree structure, and the chroma CTB may be partitioned into chroma CUs based on another coding tree structure. That is, a CU in an I slice/tile group, to which the separate block tree structure is applied, may consist of a coding block of a luma component or coding blocks of two chroma components. In addition, a CU in an I slice/tile group, to which the same block tree structure is applied, and a CU of a P or B slice/tile group may consist of blocks of three color components (a luma component and two chroma components).

Although a quadtree coding tree structure with a nested multitype tree has been described, a structure in which a CU is partitioned is not limited thereto. For example, the BT structure and the TT structure may be interpreted as a concept included in a multiple partitioning tree (MPT) structure, and the CU may be interpreted as being partitioned through the QT structure and the MPT structure. In an example where the CU is partitioned through a QT structure and an MPT structure, a syntax element (e.g., MPT_split_type) including information on how many blocks the leaf node of the QT structure is partitioned into and a syntax element (ex. MPT_split_mode) including information on which of vertical and horizontal directions the leaf node of the QT structure is partitioned into may be signaled to determine a partitioning structure.

In another example, the CU may be partitioned in a different way than the QT structure, BT structure or TT structure. That is, unlike that the CU of the lower depth is partitioned into ¼ of the CU of the higher depth according to the QT structure, the CU of the lower depth is partitioned into ½ of the CU of the higher depth according to the BT structure, or the CU of the lower depth is partitioned into ¼ or ½ of the CU of the higher depth according to the TT structure, the CU of the lower depth may be partitioned into ⅕, ⅓, ⅜, ⅗, ⅔, or ⅝ of the CU of the higher depth in some cases, and the method of partitioning the CU is not limited thereto.

Overview of Filtering

Hereinafter, a filtering method according to the present disclosure will be described.

According to some embodiments of the present disclosure, filtering may be performed on a reconstructed picture generated by an image encoding/decoding apparatus. As a result of performing filtering, a modified reconstructed picture may be generated, and the image decoding apparatus may determine the modified reconstructed picture as a final decoded picture. In addition, in the image encoding/decoding apparatus, the modified reconstructed picture may be stored in a decoding picture buffer (DPB) or a memory and then may be used as a reference picture when encoding/decoding a picture.

Filtering according to some embodiments of the present disclosure may be used as the same meaning as in-loop filtering. A filter used for filtering may include at least one of a deblocking filter, a sample offset filter (SAO) filter, an adaptive loop filter (SLF) or a bi-lateral filter. At least one of the deblocking filter, the SAO filter, the ALF and/or the bi-lateral filter may sequentially apply to a reconstructed picture, thereby generating the modified reconstructed picture. The order of applying the filter may be preset in the image encoding/decoding apparatus. For example, after the deblocking filter applies to the reconstructed picture, the SAO filter may apply. As another example, after the deblocking filter applies to the reconstructed picture, the ALF may apply. Filtering according to some embodiments of the present disclosure may be performed by at least one of the filter 160 of FIG. 2 and/or the filter 240 of FIG. 3.

For example, the deblocking filter may eliminate distortion generated at a block boundary of a reconstructed picture. For example, the deblocking filter may derive a target boundary which is a boundary between blocks in the reconstructed picture, and set a boundary strength or filter strength for the target boundary. The image encoding/decoding apparatus may perform deblocking filtering on the target boundary, by applying filtering based on the set filter strength to the target boundary. In this case, the filter strength may be determined based on at least one of prediction modes of two blocks adjacent to the target boundary, a motion vector difference, whether reference pictures are the same, or presence/absence of a non-zero efficient coefficient.

As another example, the SAO filter may compensate for an offset difference between a reconstructed picture and an original picture in units of samples. For example, the SAO filter may be implemented by a filter type such as a band offset filter or an offset filter. SAO When applying the filter, samples may be classified into different categories according to the SAO type, and an offset value may be added to each sample based on the category. Information on the SAO filter may include at least one of information on whether to apply the SAO filter, SAO filter type information and/or SAO offset value information. Meanwhile, for example, the SAO filter may be limited to apply to a reconstructed picture, to which the deblocking filter applies.

As another example, the ALF may be a sample unit filter for applying filter coefficients according to a filter shape to a reconstructed picture. The image encoding apparatus may signal at least one of whether to apply the ALF, the shape of the ALF and/or a filter coefficient, by comparing a reconstructed picture with an original picture. That is, information on the ALF may include at least one of information on whether to apply the ALF, ALF filter shape information and/or ALF filtering coefficient information. Meanwhile, for example, the ALF may be limited to apply to a reconstructed picture, to which the deblocking filter applies.

Figure 6:
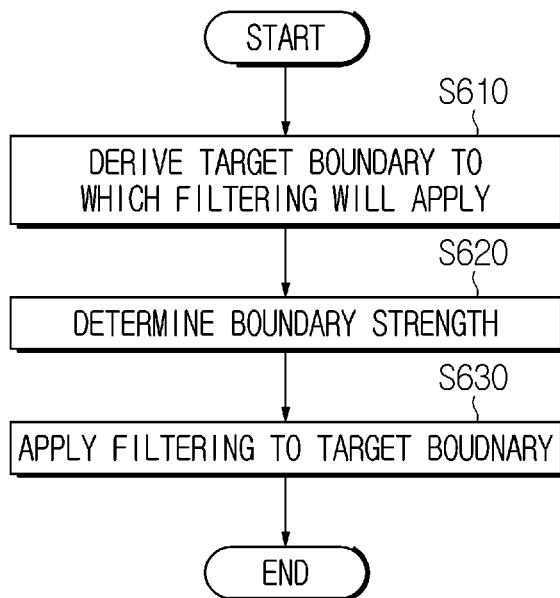
FIG. 6 is a view illustrating an application method of a deblocking filter according to an embodiment.

FIG. 6 is a view illustrating an application method of a deblocking filter.

As described above, a deblocking filter may apply to a reconstructed picture. The deblocking filter may apply to a boundary of each CU or TU included in a current block, based on the encoding/decoding order of a picture.

Referring to FIG. 6, the application method of the deblocking filter according to some embodiments of the present disclosure may include deriving a target boundary, to which deblocking filtering will apply (S610), determining a filter strength (S620) and applying the deblocking filter to the target boundary based on the determined filter strength (S630).

Hereinafter, determining the filter strength applying to the target boundary (S620) will be described. According to some embodiments of the present disclosure, the filter strength may be determined according to conditions of a transform block adjacent to the target boundary. In the following description, when the target boundary is a vertical boundary, based on the target boundary, a left block may be defined as a P block and a right block may be defined as a Q block. In addition, when the target boundary is a horizontal boundary, based on the target boundary, a top block may be defined as a P block and a bottom block may be defined as a Q block. In addition, in the following description, a first value, second value and third value of the filter strength may respectively mean 0, 1 and 2, but the scope of the present disclosure is not limited to this definition.

For example, when block based quantized residual domain differential pulse-code modulation (BDPCM) applies to the P block sample and the Q block sample included in one luma CU, the filter strength for the target boundary may be determined to be a first value. As another example, when a P block sample and a Q block sample included in one CU is intra-predicted, the filter strength for the target boundary may be determined to be a third value. As another example, when the target boundary is a boundary of a TU and combined inter and intra prediction (CIIP) applies to the P block sample and Q block sample included in one CU, the filter strength for the target boundary may be determined to be a third value. As another example, when the target boundary is a boundary of a TU and at least one of a P block sample and Q block sample included in one TU has a non-zero transform coefficient level, the filter strength for the target boundary may be determined to be a second value. As another example, when a prediction mode of a subblock of a CU including a P block sample is different from a prediction mode of a subblock of a CU including a Q block sample, the filter strength for the target boundary may be determined to be a second value.

As another example, when a current block is a luma block and at least one of the following conditions is satisfied, the filter strength for the target boundary may be determined to be a second value. Meanwhile, when all the following conditions are not satisfied, the filter strength for the target boundary may be determined to be a first value. For example, when both a subblock of a CU including a P block sample and a subblock of a CU including a Q block sample are encoded/decoded in an IBC mode and a horizontal or vertical value difference of a motion vector of each subblock is equal to or greater than 4 units of a ¼ luma sample, the filter strength for the target boundary may be determined to be a second value. Alternatively, when a subblock of a CU including a P block sample and a subblock of a CU including a Q block sample reference different reference pictures or have different numbers of motion vectors, the filter strength for the target boundary may be determined to be a second value. When one motion vector is used to predict a subblock of a CU including a P block sample and a subblock of a CU including a Q block sample or a difference between horizontal values or vertical values of a motion vector of each subblock is equal to or greater than 4 units of a ¼ luma sample, the filter strength for the target boundary may be determined to be a second value. When two motion vectors and two different reference pictures are used to predict a subblock of a CU including a P block sample and two motion vectors and two identical reference pictures are used to predict a subblock of a CU including a Q block sample and a difference between horizontal values or vertical values of motion vectors for the same reference picture is equal to or greater than 4 units of a ¼ luma sample, the filter strength for the target boundary may be determined to be a second value.

When two motion vectors and the same two reference pictures are used to predict a subblock of a CU including a P block sample and two motion and the same two reference pictures are used to predict a subblock of a CU including a Q block sample, the filter strength for the target boundary may be determined to be a second value if the following two conditions are satisfied. A first condition may mean a condition of the case where a horizontal value or vertical value difference of list 0 motion vector of each subblock is equal to or greater than 4 units of a ¼ luma sample or the case where a horizontal value or vertical value difference of list 1 motion vector of each subblock is equal to or greater than 4 units of a ¼ luma sample. A second condition may mean a condition of the case where a horizontal value or vertical value difference of a list 0 motion vector for predicting a subblock of a CU including a P block sample and list 1 motion vectors for predicting a subblock of a CU including a Q block sample is equal to or greater than 4 units of a ¼ luma sample or the case where a horizontal value or vertical value difference of a list 1 motion vector for predicting a subblock of a CU including a P block sample and list 0 motion vectors for predicting a subblock of a CU including a Q block sample is equal to or greater than 4 units of a ¼ luma sample.

The image encoding/decoding apparatus may determine a filter strength for a target boundary based on the above-described conditions. Meanwhile, when the filter strength has a first value, filtering may not be performed on the target boundary. A deblocking filter according to some embodiments of the present disclosure may apply based on at least one of a filter strength and/or a filter length.

Hereinafter, a filter strength determination method according to a reconstructed luma sample value will be described.

Figure 7:
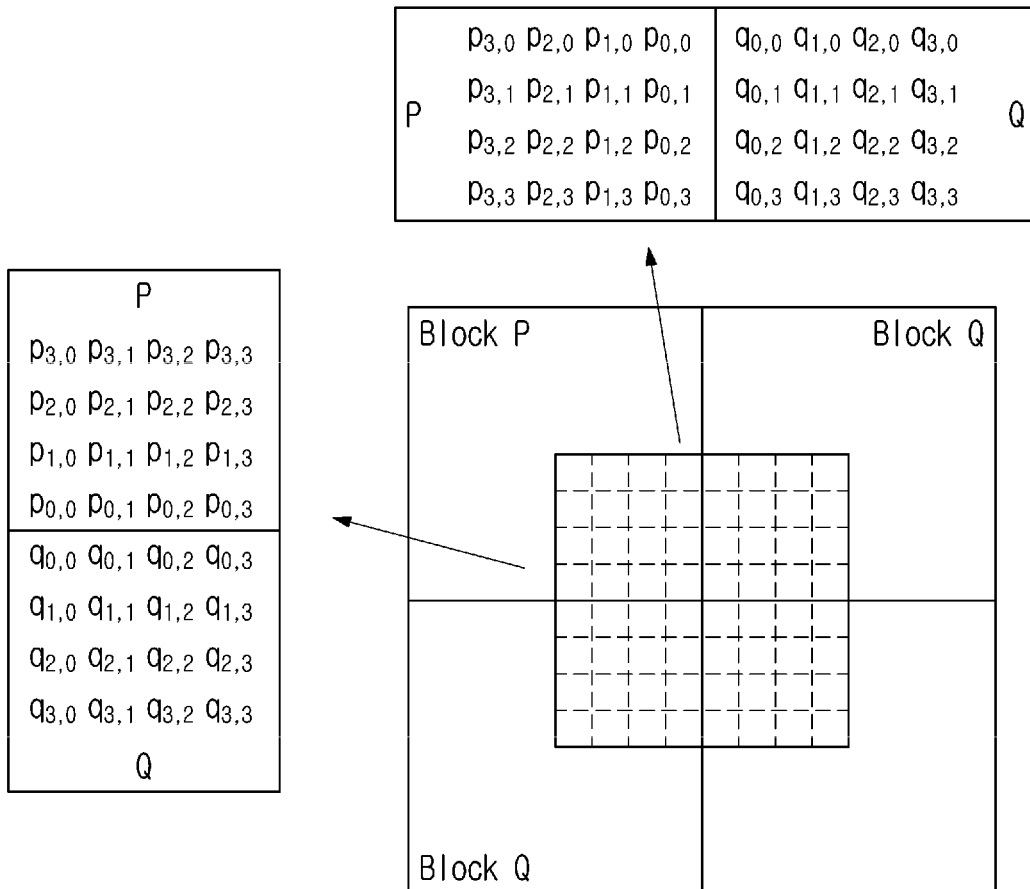
FIG. 7 is a view illustrating a filter strength determination method of a deblocking filter.

FIG. 7 is a view illustrating a filter strength determination method of a deblocking filter.

In some embodiments of the present disclosure, the deblocking filter may be determined according to variables $\beta$ and tC. Here, the variables $\beta$ and tC may be values determined by a quantization parameter qP_L. For example, the filter strength of the deblocking filter may be derived by adding an offset determined according to a reconstructed luma sample value to qP_L. For example, the reconstructed luma level may be defined as LL, and LL may be derived according to Equation 1 below.

$$LL=((p\_0,0+p\_0,3+q\_0,0+q\_0,3)>>2)/(1<<\text{bitDepth}) \quad \text{[Equation 1]}$$

p_i,k and q_i,k of Equation 1 may mean a sample value of a P block or a Q block determined according to FIG. 7.

Meanwhile, qP_L may be determined according to Equation 2 below.

$$qP\_L=((Q\_p\_Q+Q\_p\_P+1)>>1)+\text{qpOffset} \quad \text{[Equation 2]}$$

Q_p_Q and Q_p_P of Equation 2 may mean quantization parameters of a CU including q_0,0 and p_0,0, and qpOffset may be an offset transmitted at an SPS level.

In some embodiments of the present disclosure, the deblocking filter may apply to an 8×8 region. The deblocking filter may apply not only to a boundary of a CU and a boundary of a subblock or a transform block constructing a CU. In this case, the subblock may mean at least one of a subblock or a transform block generated by a subblock based merge mode, an affine mode, an intra sub partitions (ISP) mode and/or a subblock based transform.

The deblocking filter may apply to the subblock generated by the ISP mode or the subblock based transform when a non-zero coefficient is present in a boundary crossing a boundary of a TU. Meanwhile, the deblocking filter may apply to the subblock according to the subblock based merge mode or the affine mode based on reference pictures and motion vector of neighboring subblocks.

Overview of Intra Sub-Partitions (ISP)

Figure 8A:
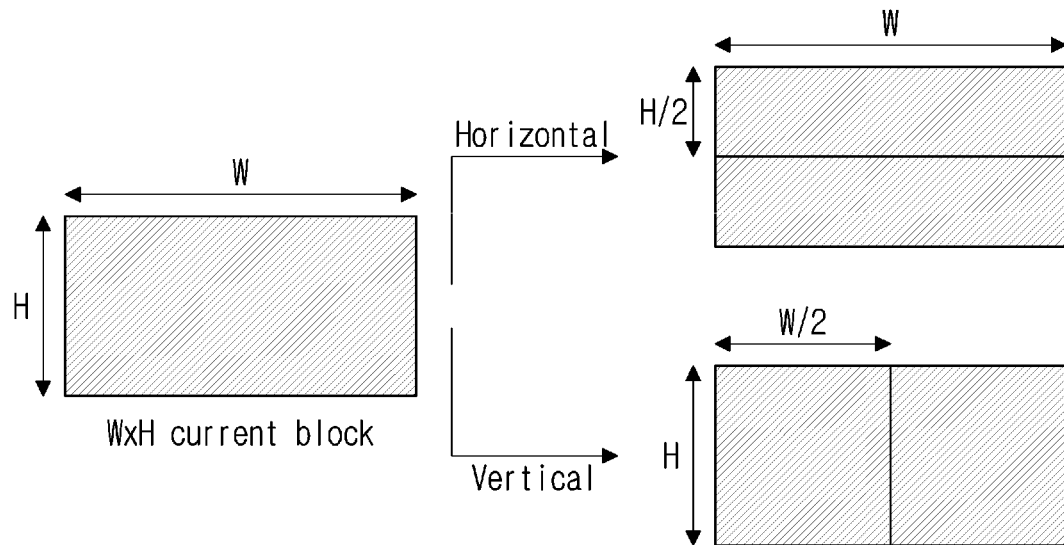
FIGS. 8A and 8B are views illustrating intra sub-partitions (ISP) among intra prediction techniques.
Figure 8B:
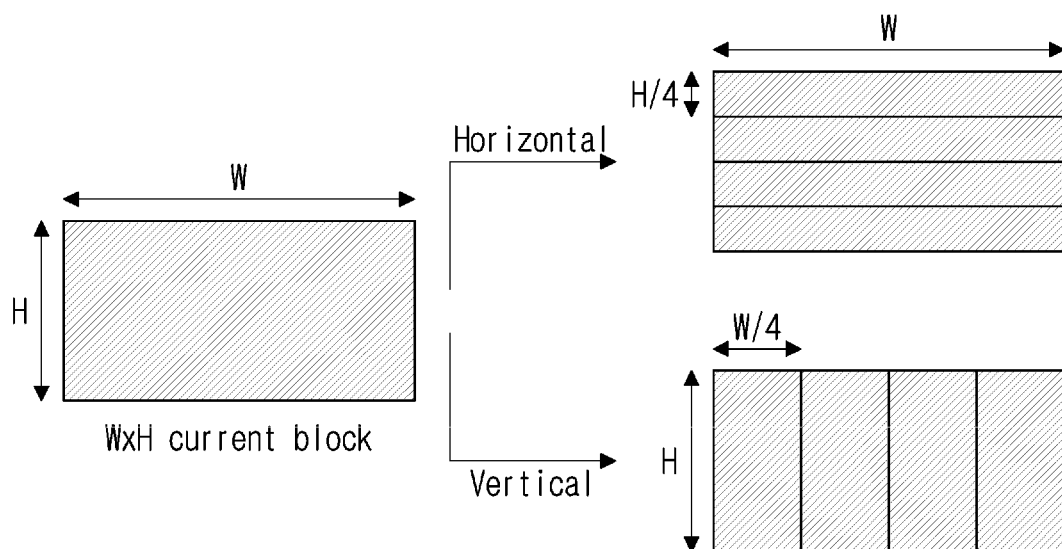

FIGS. 8A and 8B are views illustrating intra sub-partitions (ISP) among intra prediction techniques.

In conventional intra prediction, a current block to be encoded/decoded (current block) is regarded as one unit and encoding/decoding is performed without splitting. However, when applying ISP, the current block may be split in a horizontal or vertical direction and intra prediction encoding/decoding may be performed. At this time, encoding/decoding may be performed in units of split ISP subblocks to generate a reconstructed ISP subblock, and the reconstructed ISP subblock may be used as a reference block of a next split ISP subblock.

When an ISP mode applies to the current block, intra prediction may be performed with respect to each of ISP subblocks obtained by splitting the current block in a horizontal or vertical direction. That is, intra prediction, residual signal generation and reconstructed signal generation are performed in units of ISP subblocks, and a reconstructed signal of reconstructed sub-partition may be used as a reference sample of intra prediction of next sub-partition.

The image encoding apparatus may determine an ISP splitting direction using various methods (e.g., RDO based method). The determined splitting direction may be explicitly signaled through a bitstream as information on the ISP splitting direction. The image decoding apparatus may determine the ISP splitting direction of the current block based on information on the signaled splitting direction. When the ISP splitting direction is implicitly determined by the coding parameter of the current block, such as the size (width or height) of the current block, the image encoding apparatus and the image decoding apparatus may determine the ISP splitting direction of the current block using the same method.

Each of the ISP subblocks obtained by splitting the current block may be required to include a minimum of 16 samples. For example, when the current block is a 4×4 block, it may be implicitly determined that ISP does not apply. In addition, when the current block is a 4×8 block or 8×4 block, as shown in FIG. 8A, the current block to which ISP applies may be split into two ISP subblocks. In addition, when the current block is not a 4×4 block, 4×8 block or 8×4 block, as shown in FIG. 8B, the current block to which ISP applies may be split into four ISP subblocks. In the examples shown in FIGS. 8A and 8B, when the ISP splitting direction is a horizontal direction, encoding and/or decoding may be performed in order of a top ISP subblock to a bottom ISP subblock. In addition, when the ISP splitting direction is a vertical direction, encoding and/or decoding may be performed in order of a left ISP subblock to a right ISP subblock.

For example, a size of an ISP subblock or coefficient group according to the size of the current block may be determined based on Table 2 below.

TABLE 2

| Block Size | Coefficient group Size |
|---|---|
| 1 × N, N ≥ 16 | 1 × 16 |
| N × 1, N ≥ 16 | 16 × 1 |
| 2 × N, N ≥ 8 | 2 × 8 |
| N × 2, N ≥ 8 | 8 × 2 |
| All other possible M × N cases | 4 × 4 |

Embodiment #1

Hereinafter, a method of encoding/decoding an image using the above-described deblocking filter will be described. According to an embodiment of the present disclosure, a filter length of a deblocking filter may be determined. Although, in the following description, a transform block, a P block and/or a Q block is described as being a subblock derived based on an ISP mode, the scope of the present disclosure is not limited thereto. Here, the transform block may refer to at least one of a P block or a Q block adjacent to a target boundary. In addition, although a current block or a transform block is described as being a luma block in the following description, the scope of the present disclosure is not limited thereto.

According to an embodiment of the present disclosure, when a width of a P block or a width of a Q block is 4, a Q block filter length applying to a target boundary which is a vertical boundary may be determined to be 1. In contrast, when a width of a Q block is equal to or greater than 32, a Q block filter length applying to the target boundary may be determined to be 7. In other case, a Q block filter length applying to the target boundary may be determined to be 3.

Meanwhile, when a width of a P block or a width of a Q block is 4, a P block filter length applying to a target boundary which is a vertical boundary may be determined to be 1. In contrast, when a width of a P block is equal to or greater than 32, a P block filter length applying to the target boundary may be determined to be 7. In other case, a P block filter length applying to the target boundary may be determined to be 3.

Meanwhile, when a height of a P block or a height of a Q block is 4, a Q block filter length applying to a target boundary which is a horizontal boundary may be determined to be 1. In contrast, when a height of a Q block is equal to or greater than 32, a filter length applying to the target boundary may be determined to be 7. In other case, a Q block filter length applying to the target boundary may be determined to be 3.

Meanwhile, when a height of a P block or a height of a Q block is 4, a P block filter length applying to a target boundary which is a horizontal boundary may be determined to be 1. In contrast, when a height of a P block is equal to or greater than 32, a filter length applying to the target boundary may be determined to be 7. In other case, a P block filter length applying to the target boundary may be determined to be 3.

According to an embodiment of the present disclosure, when a width or size of a transform block is equal to or less than a predetermined value, there may be a problem that parallelization of the filter cannot be performed. Hereinafter, the problem of the deblocking filter which may occur in the above-described embodiment will be described in detail.

Figure 9:
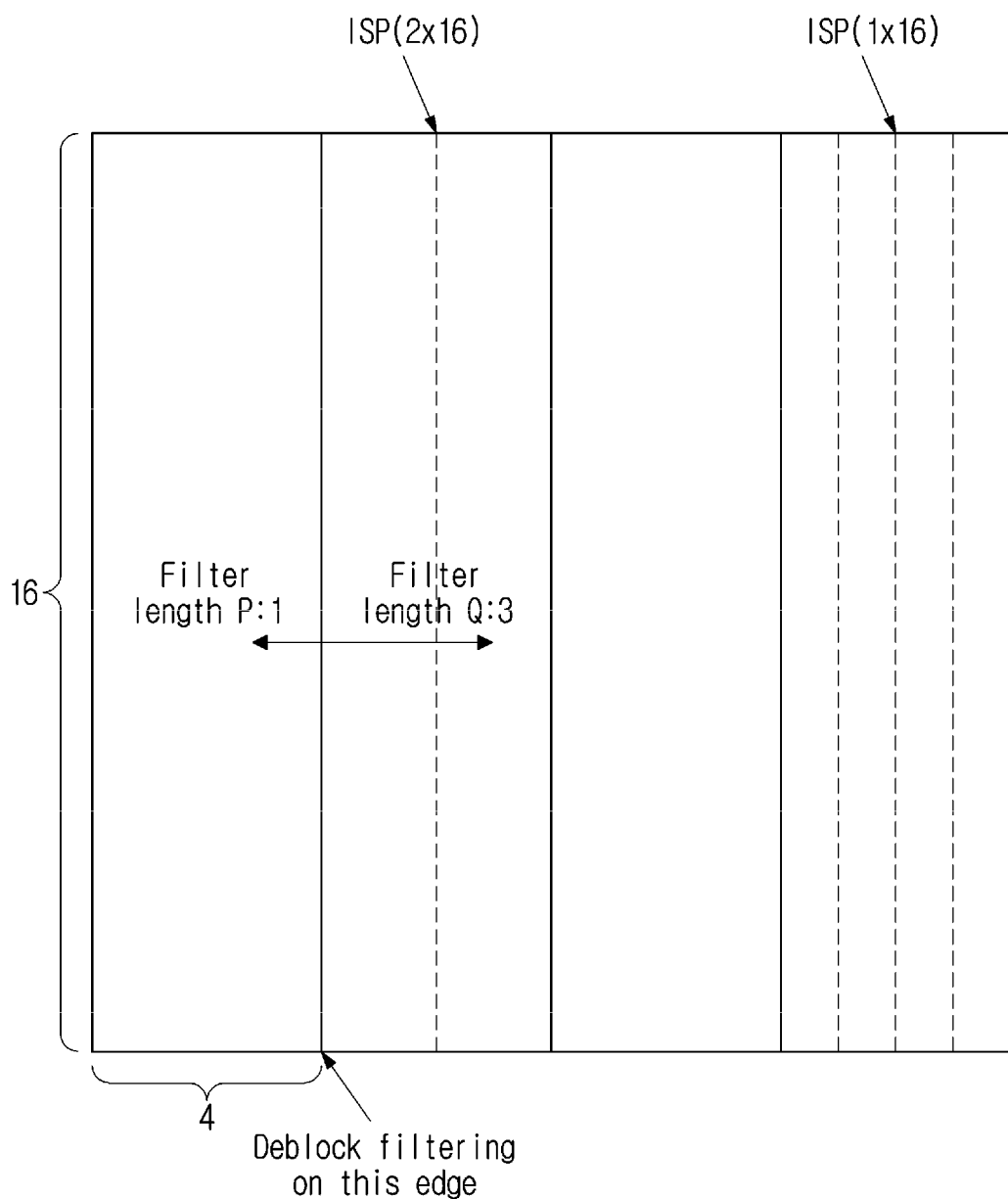
FIGS. 9 to 11 are views illustrating a filter length determination method of a deblocking filter applying to a target boundary.
Figure 10:
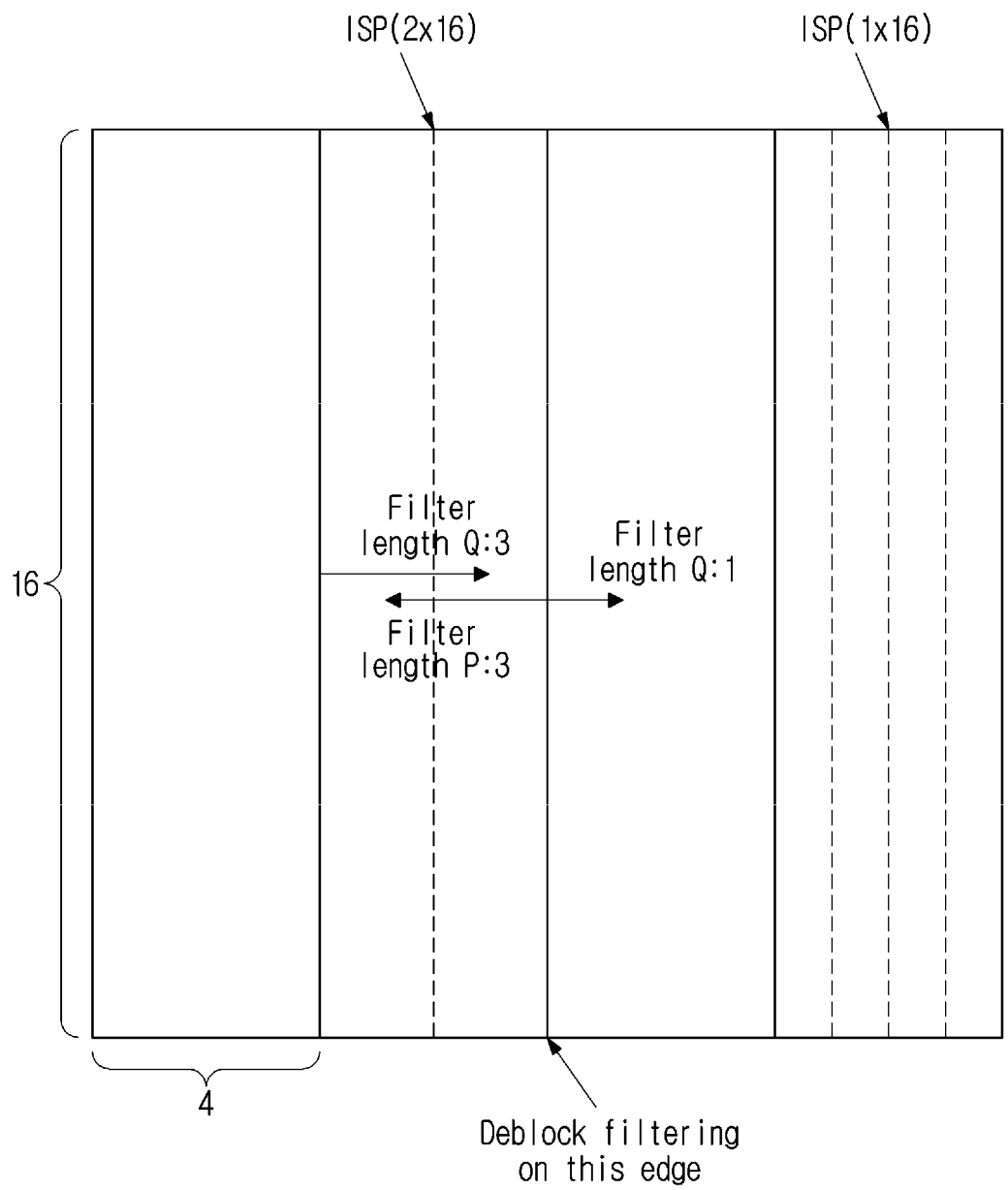
Figure 11:
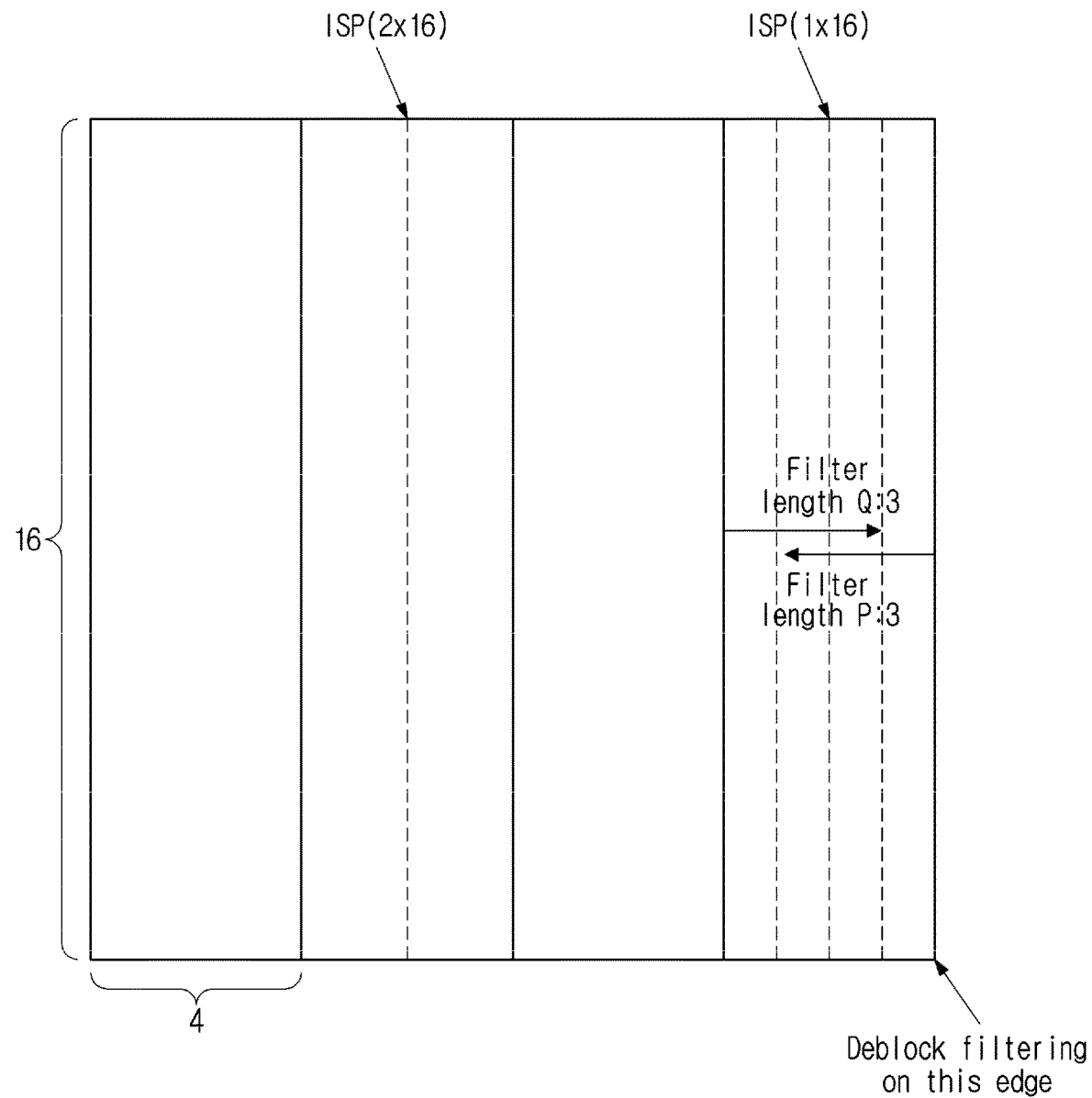

FIGS. 9 to 11 are views illustrating a filter length determination method of a deblocking filter applying to a target boundary.

FIGS. 9 to 11 show states in which a 16×16 block is partitioned into four 4×16 blocks, and second and fourth 4×16 blocks are respectively partitioned into two 2×16 and four 1×16 subblocks by an ISP mode.

Referring to FIG. 9, for a first filter boundary, a P block filter length may be determined to be 1, and a Q block filter length may be determined to be 3. Referring to FIG. 10, for a second filter boundary, a P block filter length may be determined to be 3 and a Q block filter length may be determined to be 1. Referring to FIG. 11, for a third filter boundary, a Q block filter length may be determined to be 3 and, for a fourth filter boundary, a P block filter length may be determined to be 3.

In FIGS. 10 and 11, although the width of the subblock is less than 4, since a sum of a filter length when the corresponding block is a P block and a filter length when the corresponding block is a Q block is greater than 4, overlapping between filtering applied by both boundaries may occur. There may be a problem that parallel processing for filtering cannot be performed by overlapping filter length overlapping. Hereinafter, a method of solving such a problem will be described in detail.

In particular, when an ISP mode applies to a current block, a transform block generated as an intra prediction result may have a size smaller than that of a conventionally defined maximum transform block. That is, according to some embodiments of the present disclosure, parallel processing for filtering may be performed even on a block to which the ISP mode applies.

Figure 12:
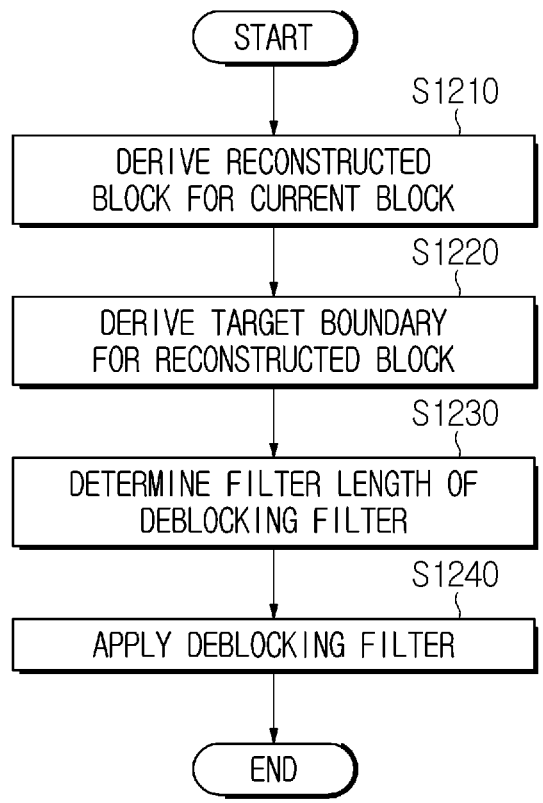
FIG. 12 is a view illustrating an image encoding/decoding method according to an embodiment of the present disclosure.

FIG. 12 is a view illustrating an image encoding/decoding method according to an embodiment of the present disclosure.

Referring to FIG. 12, an image encoding/decoding method according to an embodiment of the present disclosure may include deriving a reconstructed block for a current block (S1210), deriving a target boundary for the reconstructed block (S1220), determining a filter length of a deblocking filter to be applied for the target boundary (S1230) and/or applying the deblocking filter based on the determined filter length (S1240).

In this case, the filter length may be determined based on at least one of a width or height of a transform block adjacent to the target boundary.

Embodiment #2

According to another embodiment of the present disclosure, when a width or height of a transform block satisfies a predetermined condition, a filter length applying to a target boundary may be determined in consideration of this.

For example, when the width or height of the transform block is less than a size of a minimum transform block, a filter length applying to the target boundary may be determined to be a preset value. For example, when the width or height of the transform block is less than 4, the filter length applying to the target boundary may be determined to be 1.

Figure 13:
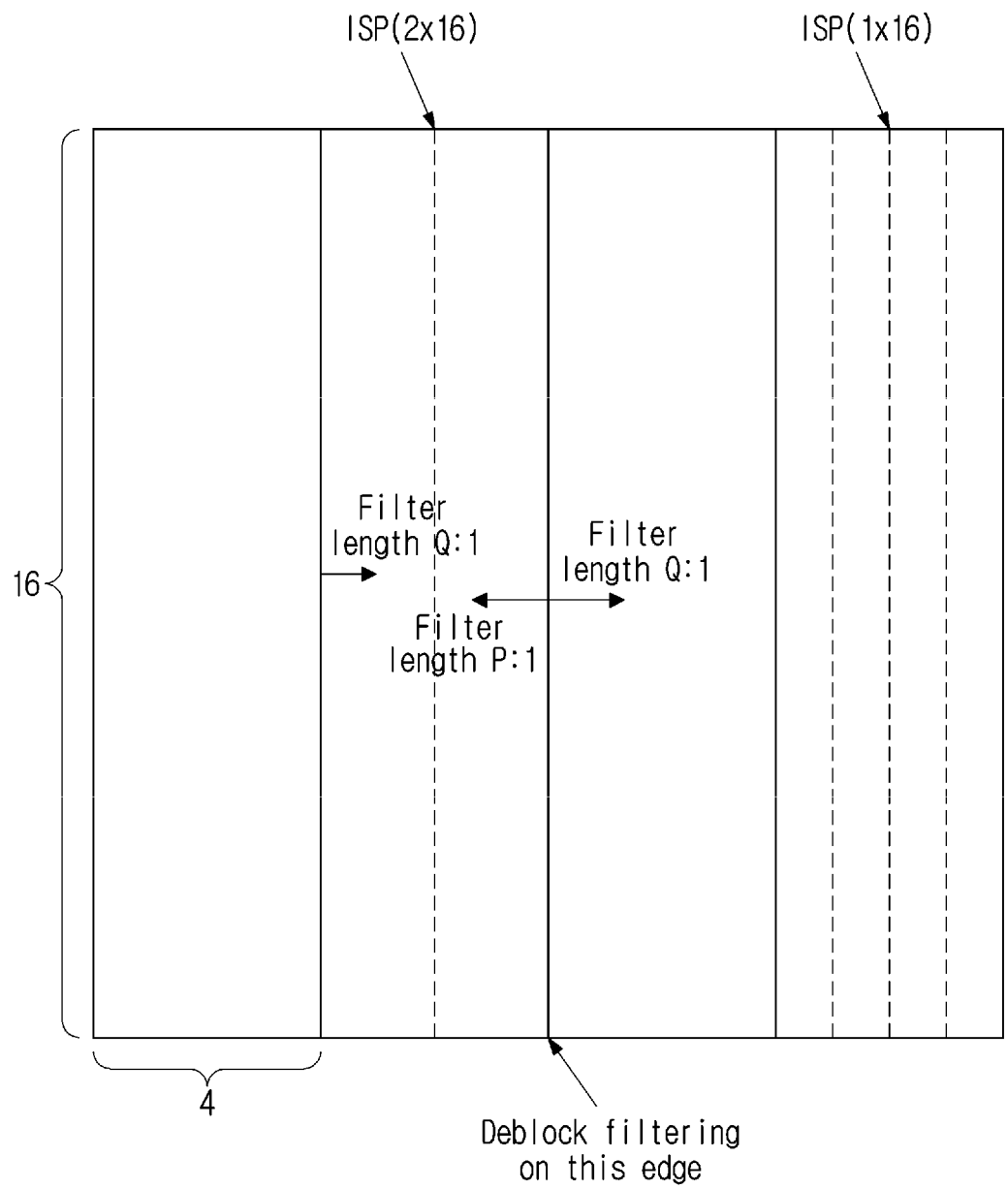
FIGS. 13 and 14 are views illustrating a deblocking filter length determination method according to another embodiment of the present disclosure.
Figure 14:
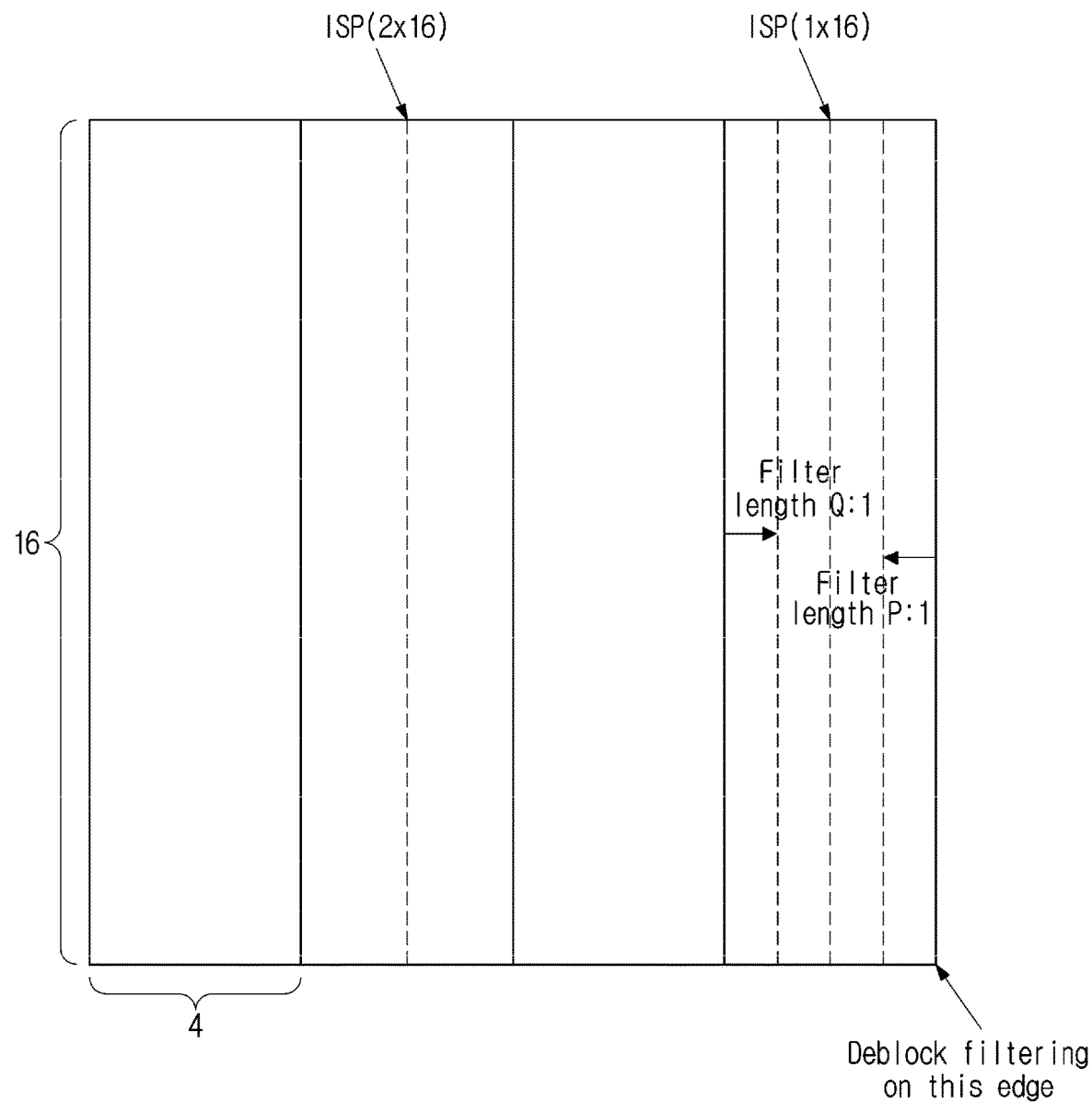

FIGS. 13 and 14 are views illustrating a deblocking filter length determination method according to another embodiment of the present disclosure.

FIG. 13 shows a deblocking filter length determination method that solves the problem according to the embodiment of FIG. 10. When the width or height of the transform block is equal to or less than 4, the filter length of the target boundary may be determined to be 1. Referring to FIG. 13, since the width of a 2×16 subblock is equal to or less than 4, both a Q block filter length of a first target boundary and a P block filter length of a second target boundary may be determined to be 1. Therefore, overlapping between the Q block filter of the first target boundary and the P block filter of the second target boundary may not occur.

FIG. 14 shows a deblocking filter length determination method that solves the problem according to the embodiment of FIG. 11. Referring to FIG. 13, since the width of a 1×16 ISP subblock is equal to or less than 4, both a Q block filter length of a first target boundary and a P block filter length of a second target boundary may be determined to be 1. Therefore, overlapping between the Q block filter of a third target boundary and the P block filter of a fourth target boundary may not occur.

Figure 15:
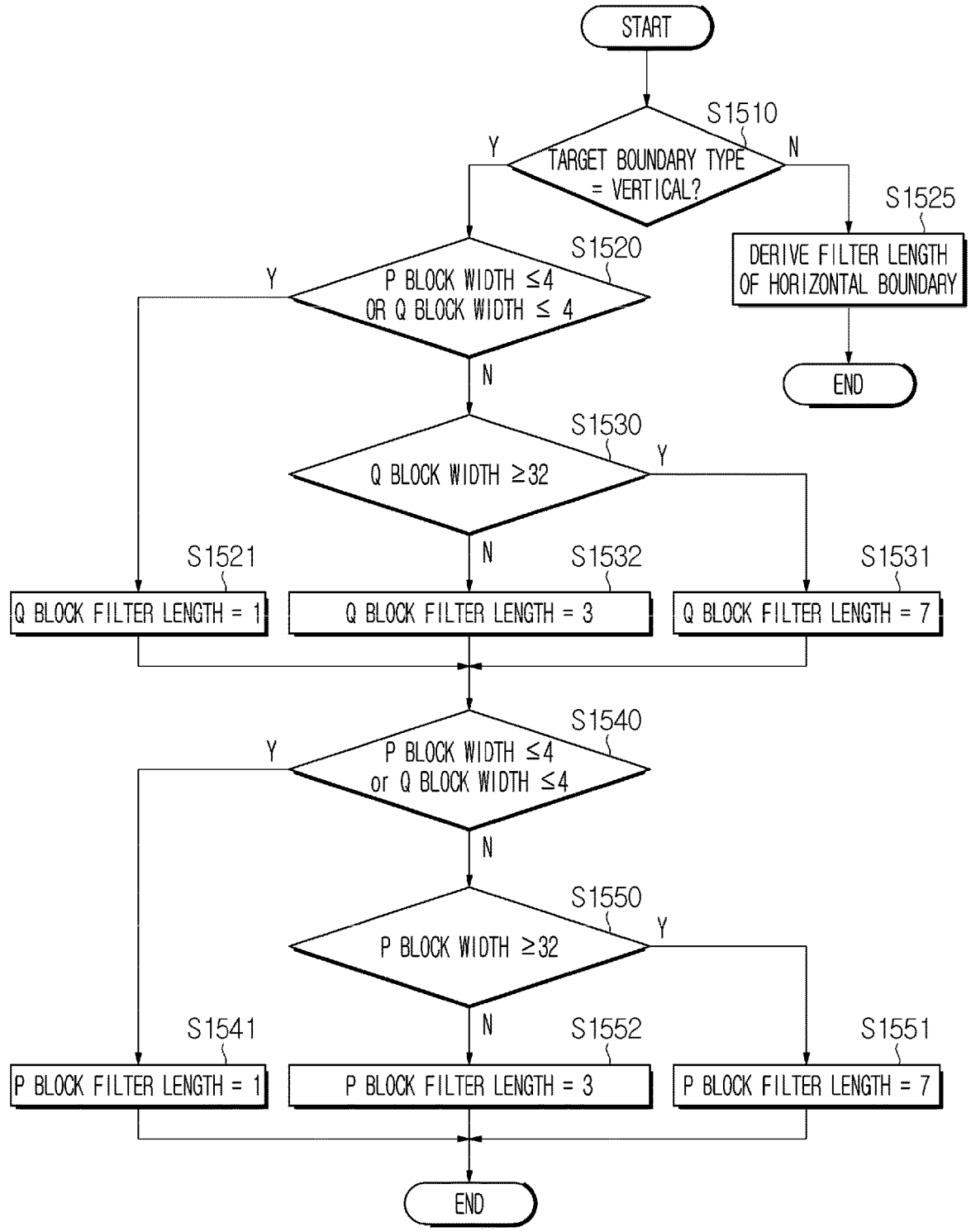
FIGS. 15 and 16 are views illustrating a deblocking filter length determination method according to another embodiment of the present disclosure.
Figure 16:
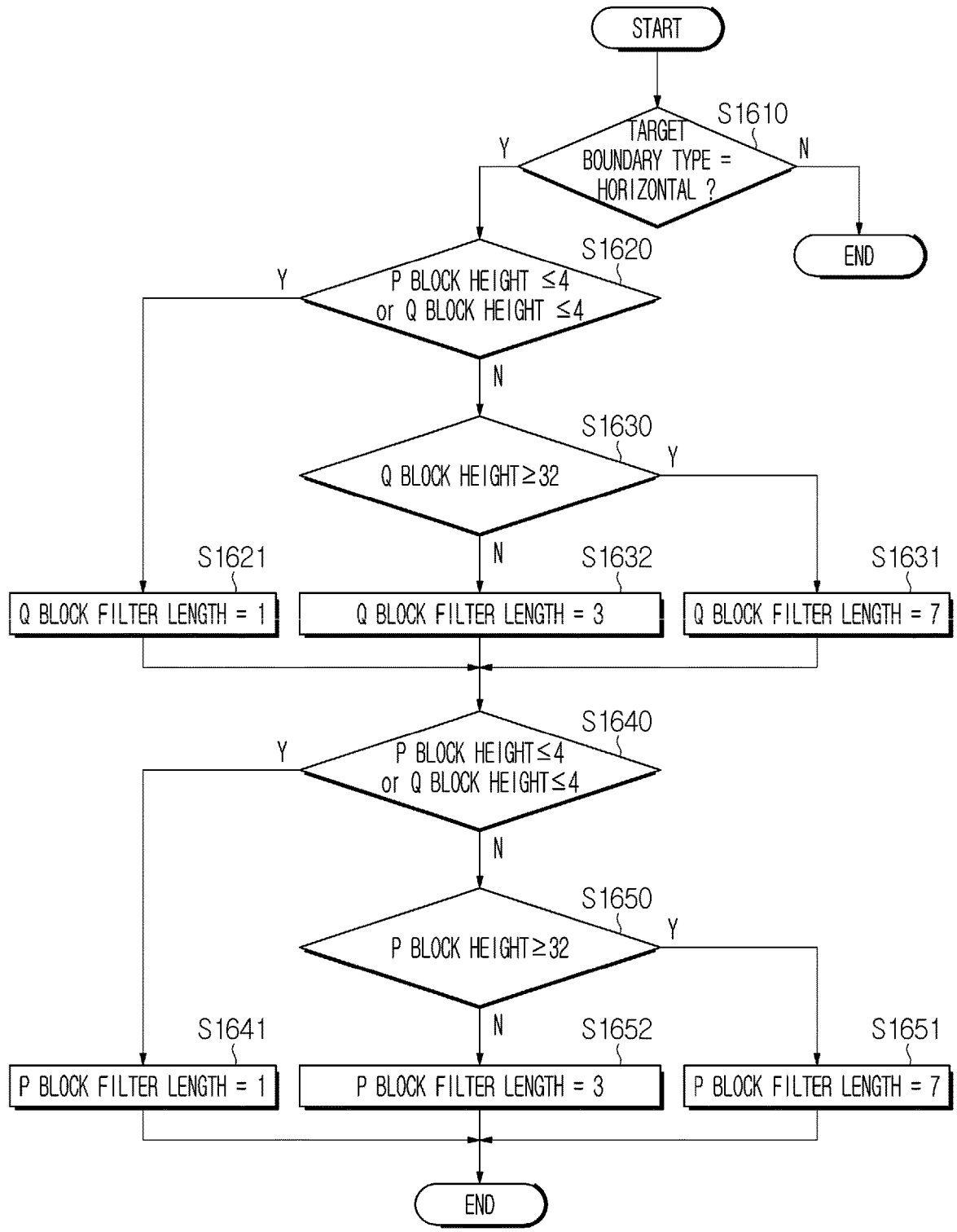

FIGS. 15 and 16 are views illustrating a deblocking filter length determination method according to another embodiment of the present disclosure.

Referring to FIG. 15, first, whether a derived target boundary is a vertical boundary or a horizontal boundary may be determined (S1510). When the target boundary is a horizontal boundary (S1510—N), a filter length derivation process of the horizontal boundary may be performed (S1525). The filter length derivation process of the horizontal boundary will be described through FIG. 16.

For example, an image encoding/decoding apparatus may first determine a Q block filter length. When the target boundary is a vertical boundary (S1510—Y), at least one of a width of a P block or a width of a Q block is equal to or less than a first value may be determined (S1520). When at least one of the width of the P block or the width of the Q block is equal to or less than the first value (S1520—Y), a Q block filter length for the target boundary may be determined to be a first length (S1521). Meanwhile, when the width of the P block and the width of the Q block are greater than the first value (S1520—N), whether the width of the Q block is equal to or greater than a second value (S1530). When the width of the Q block is equal to or greater than the second value (S1530—Y), the Q block filter length for the target boundary may be determined to be a second length (S1531). Meanwhile, when the width of the Q block is greater than the first value and is less than the second value (S1530—N), the Q block filter length for the target boundary may be determined to be a third length (S1532).

Next, the image encoding/decoding apparatus may determine a P block filter length. After determining the Q block filter length, whether at least one of the width of the P block or the width of the Q block is equal to or less than a first value may be determined (S1540). When at least one of the width of the P block or the width of the Q block is equal to or less than the first value (S1540—Y), the P block filter length for the target boundary may be determined to be a first length (S1541). Meanwhile, when the width of the P block and the width of the Q block are greater than the first value (S1540—N), whether the width of the P block is equal to or greater than a second value may be determined (S1550). When the width of the P block is equal to or greater than the second value (S1550—Y), the P block filter length for the target boundary may be determined to be a second length (S1551). Meanwhile, when the width of the P block is greater than the first value and is less than the second value (S1550—N), the P block filter length for the target boundary may be determined to be a third length (S1552).

For example, the first value and the second value may be 4 and 32, respectively. In addition, the first length, the second length and the third length may respectively have values of 1, 7 and 3, but it is only an example and is not limited thereto. In addition, although the embodiment in which the Q block filter length is first derived and then the P block filter length is derived is described in the above example, an embodiment in which the Q block filter length is first derived and then the P block filter length is derived and an embodiment in which the Q block filter length and the P block filter length are simultaneously derived may also be included in the scope of the present disclosure.

Referring to FIG. 16, first, whether the derived target boundary is a vertical boundary or a horizontal boundary may be determined (S1610). S1620 to S1651 of FIG. 16 may be a detailed description of S1525 of FIG. 15. In addition, S1610 of FIG. 16 and S1510 of FIG. 15 may indicate the same configuration.

For example, the image encoding/decoding apparatus may first determine a Q block filter length. When the target boundary is a horizontal boundary (S1610—Y), at least one of the height of the P block or the height of the Q block is equal to or less than a first value (S1620). When at least one of the width of the P block or the width of the Q block is equal to or less than the first value (S1620—Y), a Q block filter length for the target boundary may be determined to be a first length (S1621). Meanwhile, when the height of the P block and the height of the Q block are greater than the first value (S1620—N), whether the height of the Q block is equal to or greater a second value may be determined (S1630). When the height of the Q block is equal to or greater than the second value (S1630—Y), the Q block filter length for the target boundary may be determined to be a second length (S1631). Meanwhile, when the height of the Q block is greater than the first value and is less than the second value (S1530—N), the Q block filter length for the target boundary may be determined to be a third length (S1532).

Next, the image encoding/decoding apparatus may determine a P block filter length. After determining the Q block filter length, whether at least one of the height of the P block or the height of the Q block is equal to or less than the first value may be determined (S1640). When at least one of the height of the P block or the height of the Q block is equal to or less than the first value (S1640—Y), a P block filter length for the target boundary may be determined to be the first length (S1641). Meanwhile, when the height of the P block and the height of the Q block are greater than the first value (S1640—N), whether the height of the P block is equal to or greater than a second value (S1650). When the height of the P block is equal to or greater than the second length (S1650—Y), the P block filter length for the target boundary may be determined to be a second length (S1651). Meanwhile, when the height of the P block is greater than the first value and is less than the second value (S1650—N), the P block filter length for the target boundary may be determined to be a third length (S1652).

For example, the first value and the second value may be 4 and 32, respectively. In addition, the first length, the second length and the third length may respectively have values of 1, 7 and 3, but it is only an example and is not limited thereto. In addition, although the embodiment in which the Q block filter length is first derived and then the P block filter length is derived is described in the above example, an embodiment in which the Q block filter length is first derived and then the P block filter length is derived and an embodiment in which the Q block filter length and the P block filter length are simultaneously derived may also be included in the scope of the present disclosure.

According to the present embodiment, since a situation in which parallel processing of the deblocking filter is impossible due to a decrease in size of the transform block (e.g., in the case of a subblock generated by applying the ISP mode) or a situation in which overlapping between filters occurs due to different target boundaries does not occur, the image encoding/decoding apparatus may always perform filter parallel processing and image encoding/decoding efficiency may increase.

In this description, performing parallelization or parallel processing does not mean that the image encoding/decoding apparatus always performs parallel processing. Even when parallel processing is supported, whether to perform parallel processing may be determined in consideration of hardware performance, service type and service quality of the image encoding/decoding apparatus. For example, when the image encoding/decoding apparatus is implemented using a multiprocessor, parallel processing of the deblocking filter may be performed through the embodiment of the present disclosure. Meanwhile, when the image encoding/decoding apparatus is implemented using a single processor, the deblocking filter may sequentially apply to the target boundary without applying the above-described embodiment.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an OTT video (over the top video) device, an Internet streaming service providing device, a three-dimensional (3D) video device, a video telephony video device, a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Figure 17:
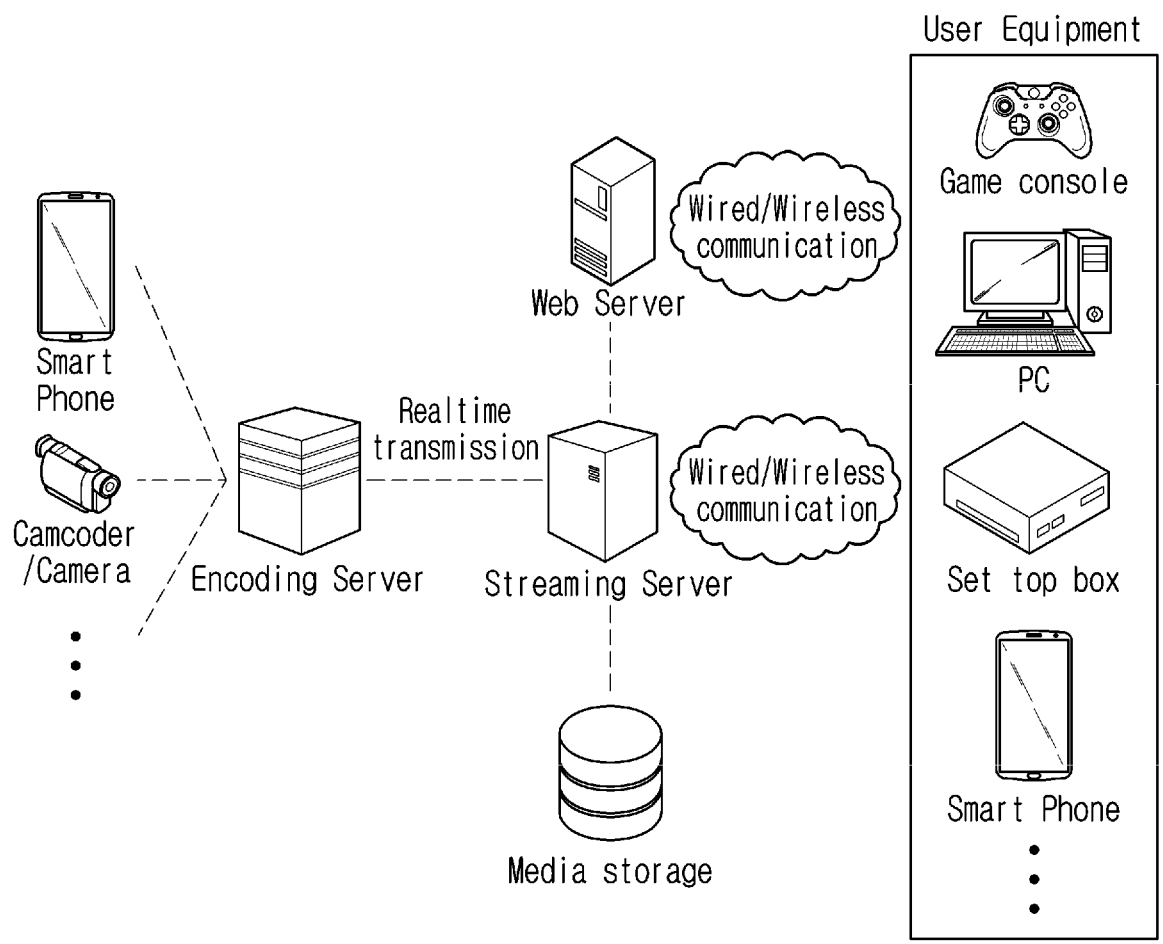
FIG. 17 is a view showing a content streaming system, to which an embodiment of the present disclosure is applicable.

FIG. 17 is a view showing a contents streaming system, to which an embodiment of the present disclosure is applicable.

As shown in FIG. 17, the contents streaming system, to which the embodiment of the present disclosure is applied, may largely include an encoding server, a streaming server, a web server, a media storage, a user device, and a multimedia input device.

The encoding server compresses contents input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the contents streaming system may include a separate control server. In this case, the control server serves to control a command/response between devices in the contents streaming system.

The streaming server may receive contents from a media storage and/or an encoding server. For example, when the contents are received from the encoding server, the contents may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the contents streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to encode or decode an image.

What is claimed is:

1. An image decoding method performed by an image decoding apparatus, the image decoding method comprising:
    deriving a target boundary of a deblocking filter;
    determining a maximum length of the deblocking filter for the target boundary; and
    applying the deblocking filter for the target boundary based on the maximum length;
    wherein, based on the target boundary being a vertical boundary:
        the maximum length is determined based on a width of a first block adjacent to a left side of the target boundary or a second block adjacent to a right side of the target boundary,
        the maximum length comprises a first maximum length at first block side and a second maximum length at second block side, and
        based on a width of the first block being equal to or less than 4, the first maximum length and the second maximum length are determined to be 1, and
    wherein, based on the target boundary being a horizontal boundary;
        the maximum length is determined based on a height of a third block adjacent to an upper side of the target boundary or a fourth block adjacent to a lower side of the target boundary,
        the maximum length comprises a third maximum length at third block side and a fourth maximum length at fourth block side, and
        based on a height of the third block being equal to or less than 4, the third maximum length and the fourth maximum length is determined to be 1.

2. The image decoding method of claim 1,
    wherein the first to fourth blocks are sub-blocks based on an intra sub-partitions (ISP) mode, and
    wherein the maximum length is determined to be equal to or less than a width of the first block or the second block, or a height of the third block or the fourth block.

3. The image decoding method of claim 1,
    wherein, based on a width of the first block being equal to or greater than 32, the first maximum length is determined to be 7, and
    wherein, based on a width of the second block being equal to or greater than 32, the second maximum length is determined to be 7.

4. The image decoding method of claim 1,
    wherein, based on a width of the first block being less than 32, the first maximum length is determined to be 3, and
    wherein, based on a width of the second block being less than 32, the second maximum length is determined to be 3.

5. The image decoding method of claim 1,
    wherein, based on a height of the third block being equal to or greater than 32, the third maximum length is determined to be 7, and
    wherein, based on a height of the fourth block being equal to or greater than 32, the fourth maximum length is determined to be 7.

6. The image decoding method of claim 1,
    wherein, based on a height of the third block being less than 32, the third maximum length is determined to be 3, and
    wherein, based on a height of the fourth block being less than 32, the fourth maximum length is determined to be 3.

7. An image encoding method performed by an image encoding apparatus, the image encoding method comprising:
    deriving a target boundary of a deblocking filter;
    determining a maximum length of the deblocking filter for the target boundary; and
    applying the deblocking filter for the target boundary based on the maximum length,
    wherein, based on the target boundary being a vertical boundary:

the maximum length is determined based on a width of a first block adjacent to a left side of the target boundary or a second block adjacent to a right side of the target boundary, the maximum length comprises a first maximum length at first block side and a second maximum length at second block side, and based on a width of the first block being equal to or less than 4, the first maximum length and the second maximum length are determined to be 1, and wherein, based on the target boundary being a horizontal boundary;

the maximum length is determined based on a height of a third block adjacent to an upper side of the target boundary or a fourth block adjacent to a lower side of the target boundary, the maximum length comprises a third maximum length at third block side and a fourth maximum length at fourth block side, and based on a height of the third block being equal to or less than 4, the third maximum length and the fourth maximum length is determined to be 1.

8. The image encoding method of claim 7, wherein the first to fourth blocks are sub-blocks based on an intra sub-partitions (ISP) mode, and wherein the maximum length is determined to be equal to or less than a width of the first block or the second block, or a height of the third block or the fourth block.

9. The image encoding method of claim 7, wherein the maximum length is determined by comparing the width or the height with a predetermined threshold value, and wherein a number of target blocks of the comparing is determined to be 1 or 2 based on the predetermined threshold value.

10. A non-transitory computer-readable recording medium storing a bitstream generated by the image encoding method of claim 7.

11. A method for transmitting a bitstream generated by an image encoding method, the image encoding method comprising:

deriving a target boundary of a deblocking filter;

determining a maximum length of the deblocking filter for a target boundary of a reconstructed block; and applying the deblocking filter for the target boundary based on the maximum length, wherein, based on the target boundary being a vertical boundary:

the maximum length is determined based on a width of a first block adjacent to a left side of the target boundary or a second block adjacent to a right side of the target boundary, the maximum length comprises a first maximum length at first block side and a second maximum length at second block side, and based on a width of the first block being equal to or less than 4, the first maximum length and the second maximum length are determined to be 1, and wherein, based on the target boundary being a horizontal boundary;

the maximum length is determined based on a height of a third block adjacent to an upper side of the target boundary or a fourth block adjacent to a lower side of the target boundary, the maximum length comprises a third maximum length at third block side and a fourth maximum length at fourth block side, and based on a height of the third block being equal to or less than 4, the third maximum length and the fourth maximum length is determined to be 1.

* * * * *